(12) United States Patent
Belenky et al.

(10) Patent No.: US 11,995,191 B2
(45) Date of Patent: May 28, 2024

(54) SIDE-CHANNEL ATTACK ON HMAC-SHA-2 AND ASSOCIATED TESTING

(71) Applicant: FortifyIQ, Inc., Newton, MA (US)

(72) Inventors: Yaacov Belenky, Maale Adumim (IL); Ury Kreimer, Tekoa (IL); Alexander Kesler, Newton, MA (US)

(73) Assignee: FortifyIQ, Inc., Newton, MA (US)

( * ) Notice: Subject to any disclaimer, the term of this patent is extended or adjusted under 35 U.S.C. 154(b) by 352 days.

(21) Appl. No.: 17/444,832

(22) Filed: Aug. 11, 2021

(65) Prior Publication Data

US 2022/0414227 A1 Dec. 29, 2022

Related U.S. Application Data

(60) Provisional application No. 63/202,831, filed on Jun. 25, 2021.

(51) Int. Cl.
*G06F 21/57* (2013.01)
*H04L 9/06* (2006.01)

(52) U.S. Cl.
CPC .......... *G06F 21/577* (2013.01); *H04L 9/0643* (2013.01); *G06F 2221/034* (2013.01)

(58) Field of Classification Search
CPC .. G06F 21/577; G06F 2221/034; G06F 21/75; G06F 21/755; H04L 9/0643; H04L 9/003
See application file for complete search history.

(56) References Cited

U.S. PATENT DOCUMENTS 7,013,395 B1 * 3/2006 Swiler ................ H04L 63/1433
713/153
2004/0213406 A1 10/2004 Halperin et al.
(Continued)

FOREIGN PATENT DOCUMENTS

WO 2020148771 A1 7/2020

OTHER PUBLICATIONS

International Search Report and Written Opinion for PCT Application No. PCT/US2022/073122, dated Oct. 19, 2022, 14 pages.
(Continued)

*Primary Examiner* — Malcolm Cribbs
(74) *Attorney, Agent, or Firm* — Brake Hughes Bellermann LLP

(57) ABSTRACT

A method for testing an HMAC implementation for vulnerability to a side-channel attack can include mounting a template attack. The attack can include generating, based on first side-channel leakage information associated with execution of a hash function of the HMAC implementation, a plurality of template tables. Each template table can correspond, respectively, with a subset of bit positions of an internal state of the hash function. The attack can further include generating, based on second side-channel leakage information, a plurality of hypotheses for an internal state of an invocation of the hash function based on a secret key. The method can further include generating, using the hash function, respective hash values generated from each of the plurality of hypotheses and a message. The method can also include comparing each of the respective hash values with a hash value generated using the secret key to determine vulnerability of the HMAC implementation.

32 Claims, 7 Drawing Sheets

(56) References Cited

U.S. PATENT DOCUMENTS

| | | | |
|---|---|---|---|
| 2010/0138925 A1* | 6/2010 | Barai | H04L 63/1433 726/25 |
| 2012/0321085 A1 | 12/2012 | Belenky | |
| 2015/0365228 A1 | 12/2015 | Belenky | |
| 2017/0180119 A1* | 6/2017 | Michiels | H04L 9/14 |
| 2018/0013736 A1* | 1/2018 | Michiels | H04L 63/061 |
| 2021/0026994 A1* | 1/2021 | Tehranipoor | G06F 30/343 |
| 2021/0367956 A1* | 11/2021 | Pergal | H04L 63/1441 |

OTHER PUBLICATIONS

Belaid, Sonia, et al. "Differential power analysis of HMAC SHA-2 in the Hamming weight model." 2013 International Conference on Security and Cryptography (SECRYPT). IEEE, 2013, 13 pages.

Gebotys, Catherine H., Brian A. White, and Edgar Mateos. "Preaveraging and carry propagate approaches to side-channel analysis of HMAC-SHA256." ACM Transactions on Embedded Computing Systems (TECS) 15.1 (2016): pp. 1-19.

McEvoy, Robert, et al. "Differential power analysis of HMAC based on SHA-2, and countermeasures." International Workshop on Information Security Applications. Springer, Berlin, Heidelberg, 2007, 16 pages.

\* cited by examiner

SIDE-CHANNEL ATTACK ON HMAC-SHA-2 AND ASSOCIATED TESTING

CROSS-REFERENCE TO RELATED APPLICATION

This application claims the benefit of U.S. Provisional Application No. 63/202,831, filed on Jun. 24, 2021, which is hereby incorporated by reference in its entirety.

TECHNICAL FIELD

This description relates to side-channel attacks on cryptographic algorithms and, more specifically, to side-channel attacks on hash-based message authentication code (HMAC) implementations, and testing of HMAC implementations for vulnerability to such side-channel attacks.

BACKGROUND

Side-channel attacks can pose a threat to cryptographic algorithms and, more specifically, data and/or information that is sought to be protected using such cryptographic algorithms. As an example, hash functions (hash algorithms), such as hash functions of the secure hash algorithm 2 (SHA-2) family, e.g., if at least some of the inputs to the hash function are secret, may be an interesting target for an attacker (e.g., bad actor, adversary, etc.) seeking to obtain such protected information. Hash based message authentication code (HMAC) implementations (e.g., hardware and/or software) are one example of cryptographic algorithms, where the inputs are at least partially secret. HMAC approaches that are implemented using hash functions, such as SHA-2 hash functions can, therefore, be a target of bad actors seeking to discover protected information. However, due to the construction of HMAC implementations, current side-channel attacks are not capable of mounting a successful attack on HMAC approaches implemented using SHA-2 family hash functions (HMAC-SHA-2). Accordingly, it follows that is it is not possible to determine susceptibility (e.g., to test for vulnerability) of an HMAC implementation to side-channel attacks.

SUMMARY

In a general aspect, a method for testing for vulnerability of an implementation of a hash-based message authentication code (HMAC) algorithm to a side-channel attack can include mounting a template attack on a hash function used to implement the HMAC algorithm. The template attack can include generating, based on first side-channel leakage information associated with execution of the hash function, a plurality of template tables, each template table of the plurality corresponding, respectively, with a subset of bit positions of an internal state of the hash function. The template attack can further include generating, based on second side-channel leakage information, a plurality of hypotheses for an internal state of an invocation of the hash function based on a secret key. The method can further include generating, using the hash function, respective hash values generated from each of the plurality of hypotheses and a message. The method can also include comparing each of the respective hash values with a hash value generated using the secret key and the message. The method can still further include, based on the comparison, determining vulnerability of the HMAC algorithm implementation based on a hash value of the respective hash values matching the hash value generated using the secret key and the message.

Implementations can include one or more of the following features. For example, the implementation of the HMAC algorithm can be one of a hardware implementation, a software implementation, or a simulator implementation.

One round of a compression function of the hash function can be calculated per calculation cycle of the hash function. A plurality of rounds of a compression function of the hash function can be calculated per calculation cycle of the hash function.

Each template table of the plurality of template tables can include a plurality of rows that are indexed using values of bits of the respective subset of bit positions. The rows can include respective side-channel leakage information of the first side-channel leakage information associated with the index values. Generating the template tables can include normalizing a value of the respective side-channel information based on an average value of a plurality of values of the respective side-channel leakage information. The plurality of rows of the template tables can be further indexed using at least one of carry bit values corresponding with the subset of bits of the internal state of the hash function, or bit values of a portion of a message schedule used to calculate the hash function.

Collecting the first side-channel leakage information can include executing the hash function using a known message schedule as a first input block of the hash function. The first side-channel leakage information can be collected based on a Hamming distance model.

Each subset of bit positions of the internal state can include a respective two-bit subset of each word of the internal state of the hash function.

The hash function can be a hash function of the Secure Hash Algorithm 2 (SHA-2) standard.

Each template table of the plurality of template tables further corresponds with a respective execution round of a compression function of the hash function.

Determining each hypothesis of the plurality of hypotheses can include determining values of respective subsets of bits of the internal state of the hash function in correspondence with the plurality of the template tables.

The hash function can be implemented in hardware. One execution round of a compression function of the hash function can be completed in one clock cycle of the hardware implementation. Multiple rounds of an execution round of a compression function of the hash function can be completed in one clock cycle of the hardware implementation.

The first side-channel leakage information and the second side-channel leakage information can include at least one of respective power consumption over time, electromagnetic emissions over time, or cache miss patterns.

In another general aspect, a method of forging a hash-based message authentication code (HMAC) can include collecting, while executing an implementation of a hash function used to produce the HMAC, first side-channel leakage information corresponding with overwriting values of an internal state of the hash function. The method can also include generating a plurality of template tables, each template table corresponding, respectively, with a subset of bits of the internal state of the hash function. Each template table of the plurality of template tables can include rows that are indexed using values of the respective subset of bits. The rows can include respective side-channel leakage information of the first side-channel leakage information associated with the index values. The method can also include collecting second side-channel leakage information associated with producing the HMAC, and identifying, based on comparison of the second side-channel leakage information with the plurality of template tables, a first plurality of hypotheses for an internal state of an inner invocation the hash function. The method can still further include identifying, based on comparison of the second side-channel leakage information with the plurality of template tables, a second plurality of hypotheses for an internal state of an outer invocation of the hash function. The method can also include selecting, using pairs of hypotheses each including a hypothesis of the first plurality of hypotheses and a hypothesis of the second plurality of hypotheses, a first hypothesis of the first plurality of hypotheses and a second hypothesis of the second plurality of hypotheses for forging the HMAC.

Implementations can include one or more of the following features. For example, generating the template tables can include normalizing a value of the respective side-channel information based on an average value of a plurality of values of the respective side-channel leakage information.

Collecting the first side-channel leakage information can include executing a single invocation of the hash function using a known message schedule as a first input block of the hash function. The first side-channel leakage information can be collected based on a Hamming distance model.

The template tables can be further indexed using at least one of carry bit values corresponding with the subset of bits of the internal state of the hash function, or bit values of a portion of a message schedule used to calculate the hash function.

The subset of bits of the internal state can include respective two-bit subsets of each word of the internal state of the hash function.

The hash function can be a hash function of the Secure Hash Algorithm 2 (SHA-2) standard.

Each template table of the plurality of template tables can correspond with a respective execution round of a compression function of the hash function.

Determining each hypothesis of the first plurality of hypotheses and each hypothesis of the second plurality of hypotheses can include determining respective subsets of bits of the internal state of the hash function in correspondence with the plurality of the template tables.

The hash function can be implemented in hardware. One execution round of a compression function of the hash function can be completed in one clock cycle of the hardware implementation. Multiple rounds of an execution round of a compression function of the hash function can be completed in one clock cycle of the hardware implementation.

The hash function can be implemented in software.

Selecting the first hypothesis of the first plurality of hypotheses and the second hypothesis of the second plurality of hypotheses for forging the HMAC can include performing a brute force attack.

The first side-channel leakage information and the second side-channel leakage information can include at least one of respective power consumption over time, electromagnetic emissions over time, or cache miss patterns.

Figure 1:
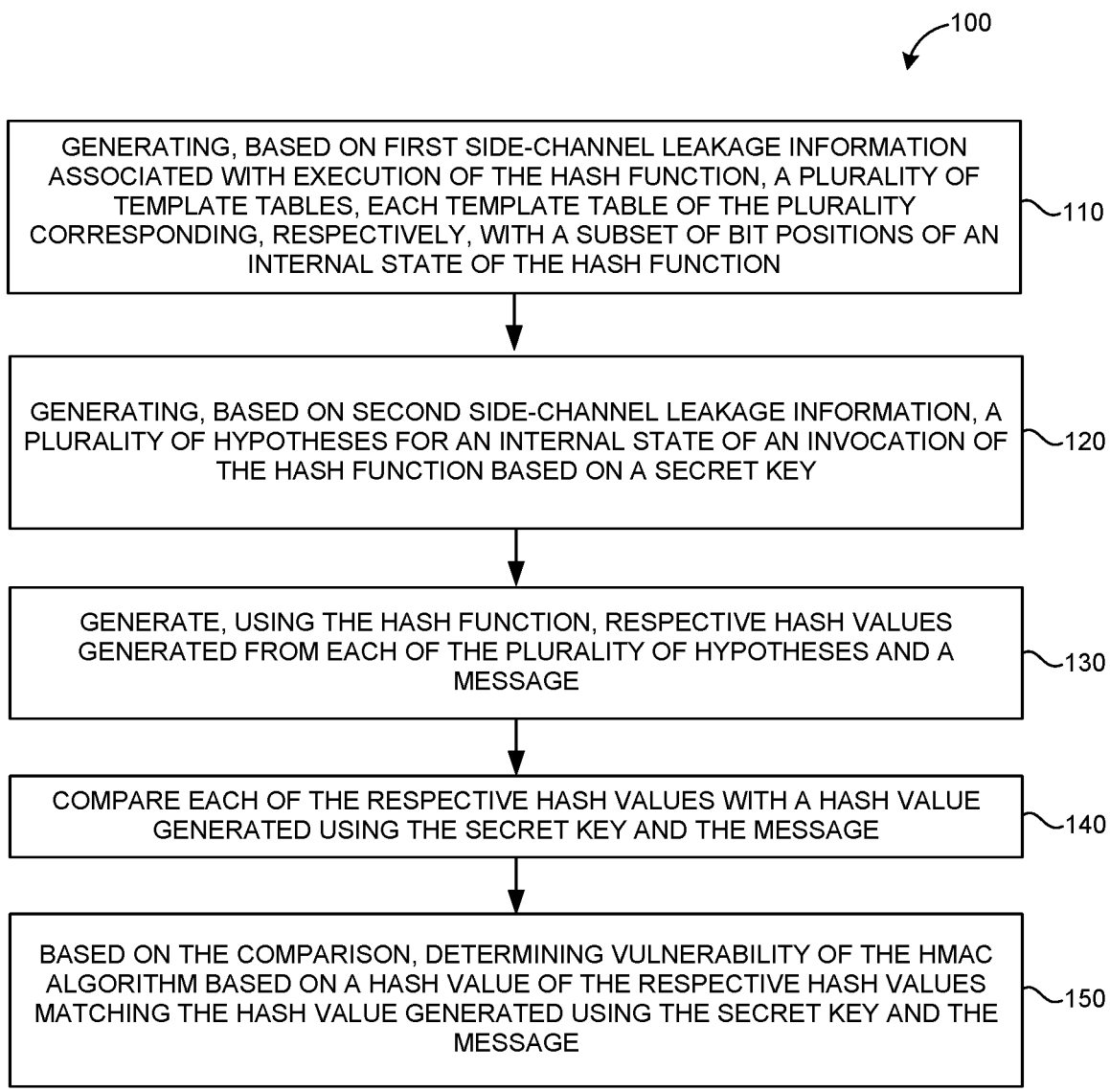
FIG. 1 is a flowchart illustrating a method for testing an HMAC implementation for vulnerability to a side-channel attack according to an aspect.

In the drawings, like reference symbols may indicate like and/or similar components (elements, structures, etc.) in different views. The drawings illustrate generally, by way of example, but not by way of limitation, various implementations discussed in the present disclosure. Reference symbols shown in one drawing may not be repeated for the same, and/or similar elements in related views. Reference symbols that are repeated in multiple drawings may not be specifically discussed with respect to each of those drawings, but are provided for context between related views. Also, not all like elements in the drawings are specifically referenced with a reference symbol when multiple instances of an element are illustrated.

DETAILED DESCRIPTION

This disclosure is directed to approaches for side-channel attacks on cryptographic algorithms. More specifically, this disclosure describes implementations of side-channel attacks on hash-based message authentication code (HMAC) implementations, as well as testing of HMAC implementations for vulnerability to such side-channel attacks, where such testing can be implemented using the approaches for mounting side-channel attacks described herein. The example implementations described herein include performing a template attack on HMAC implementation. These approaches are generally described with respect to attacks on HMAC-SHA-2 implementations, though the described approaches could be used for mounting a side-channel attack, or testing for vulnerability to a side-channel attack, for other cryptographic algorithm implementations.

In this disclosure, initially, considerations for mounting a side-channel attack and an overview of the side-channel attack implementations disclosed herein are described. Example methods for testing for vulnerability of an HMAC implementation to the disclosed side-channel attack implementations, and for mounting a complete side-channel attack on an HMAC implementation are then described. After discussion of those methods, details regarding a SHA-2 (specifically SHA-256) hash function and HMAC implementations in the context of the disclosed side-channel attack implementations are described, followed by a discussion of example details of an HMAC-SHA-2 side-channel attack. Further, following discussion of the example side-channel attack approaches, experimental results for such approaches are discussed, as well as suggestions for mitigating susceptibility to such attacks.

Considerations for Side-Channel Attacks on HMAC and Template Attack Overview

Side-channel attacks are a class of attacks that can be used to expose secret information (e.g., secret keys, key derivatives, etc.) of cryptographic algorithms by observing side effects of algorithm execution. For instance, such secret information can be leaked (e.g., determined) from various channels during algorithm execution. For instance, such channels can include execution timing, electromagnetic emanation, cache miss patterns, exotic channels such as acoustics, and so forth. However, power side-channel attacks of different types, such as simple power analysis (SPA), differential power analysis (DPA) and correlation power analysis (CPA) remain the most prevalent forms of side-channel attacks used to attack cryptographic algorithms.

While successful approaches for side-channel attacks on many prevalent cryptographic algorithms have been developed, relatively few attacks on cryptographic hash functions, such as SHA-1 and SHA-2 hash algorithms (hash functions), are known. While hash functions primitives, such as those in the SHA-2 family, may not involve, or use secret information, hash-based message authentication code (HMAC) algorithms implemented with such hash functions can use a secret key to generate a keyed digest of a corresponding message. As HMAC is widely used, it is desirable to ensure that its implementations are secure (e.g., not susceptible to side-channel analysis or attack). However, due to a general belief that no practical attacks on such HMAC implementations exist, there has not been significant effort in developing approaches for assessing their vulnerability to side-channel attacks.

One difficulty of attacking HMAC implementations is the structure of the HMAC algorithm, which, as shown in Equation (1) below, includes two invocations of an underlying hash function on a secret key.

$$HMAC_{Hash}(K, M) = Hash \overbrace{((K_0 \oplus opad) || \overline{Hash\overline{((K_0 \oplus ipad) || M)}})}^{\text{outer hash}} \quad (1)$$

where $K_0$ is a known function of a secret key K, M is an input message, and ipad and opad are known constants. The two Hash invocations are referred to as an inner hash and an outer hash, where the variable part of the inputs to the outer hash is an output of the inner hash. Accordingly, even if an adversary has full control over the input data (e.g., the message M) and manages to break the inner hash, the input to the outer hash becomes known, yet not chosen, which limits the ability of the adversary to be able to successfully forge a corresponding HMAC signature. While susceptibility of HMAC implementations, particularly HMAC-SHA-2 implementations, to side-channel attacks has been addressed by several researchers, no successful full side-channel attack has been developed.

With respect to HMAC-SHA-2 implementations, such algorithms introduce additional complexity, e.g., as compared to HMAC implementations using SHA-1 hash functions. Although the compression functions of both SHA-1 and SHA-2 algorithms mainly include arithmetic operations, there is a substantial difference between hash functions of the two families, as discussed below that account for at least some of this additional complexity.

Specifically, in SHA-1 hash functions, a round function contains a single addition operation involving an input word. The result of this addition is stored in a state register, which can be used as a target for a power correlation attack. In contrast, for SHA-2 hash functions, a round function contains two addition operations involving the input word performed in parallel, where the results are sampled in two different sub-words (e.g., A and E as described in the SHA-2 standard) of an internal state register. Because it is difficult to separate respective side-channel leakages from the two additions that are executed in parallel, a naive attack power analysis attack is highly unlikely to be successful.

Based, at least, on the foregoing considerations, the approaches for mounting a side-channel attack on HMAC (e.g., HMAC-SHA-2) implementations disclosed herein include performing a profiling (learning stage). Without such a profiling stage, it is very difficult to apply a successful DPA/CPA attack on HMAC-SHA-2 cryptographic algorithm due, at least, to the following two factors. First, using a side channel attack on the inner hash only, a derivative of the key can be found rather than the key itself, therefore, the outer hash must be attacked as well, however, can only be attacked using known messages, as opposed to chosen messages. Second, attacking SHA-2 using DPA with a known message, as compared to a chosen message, is difficult due to its prevalently linear nature.

The first factor above is important because a correlation-based attack model assumes control/knowledge of the data and a constant key. However, since the first invocation of the SHA-2 compression function works with a constant string ($K0 \oplus$ ipad), it cannot be successfully attacked using DPA. Further, the second invocation mixes a result of the first invocation with a message (or with an initial part of a message). Accordingly, a successful attack on the second invocation will reveal Hash($K0 \oplus$ ipad), but not the key itself. Therefore, Hash($K0 \oplus$ opad) must be derived separately. Also, because the input to the outer hash is an output of the inner hash, an adversary can possess knowledge of, but not control of the inner hash result. As for the second factor above, known-message attacks work well on nonlinear functions for which even a 1-bit change in the input completely changes the output. In contrast, however, due to the linearity and large word sizes of the SHA-2's algebraic constructions, DPA may choose related, but wrong key hypotheses.

Therefore, in view of at least the considerations above, the approaches for mounting a template attack disclosed herein include performing power analysis of SHA-2 that can incrementally reveal/determine, e.g., in subsets of 1, 2 or 3 bits, respective internal states (e.g., secret internal states) of the inner and outer hash function invocation, which can be, for example, pseudo-random inputs. That is, because a DPA-type analysis is difficult as explained above, the disclosed approaches for obtaining secrets from HMAC-SHA-2 implementation include performing power analysis by profiling the underlying hash function, or mounting a template attack as described herein.

In order to mount a template attack, such as those described herein, the attack should be performed using an implementation of a target device, or an implementation of a device very similar to the target device, that can be operated with known data (e.g., a known message). In such approaches, the profiling stage can be performed once. The following attack stage can, using a smaller number of traces, then be performed on the profiled device or like devices using template tables that are constructed during the profiling using the approaches describe herein. For instance, such template tables can be constructed using a Multivariate Gaussian Model to build the templates. Further, a maximum likelihood approach can be used to match the power traces collected during the attack phase to the template tables. The approaches for template attacks described herein can be based on the described template tables and Euclidean distance for matching.

In the examples described herein, during a profiling stage, the addition operation discussed above is split into 2-bit slices that include carry-in and carry-out bits, and, for each slice, a power profile is built. The attack works in successive iterations, matching the slices starting from the least significant and, for each iteration going to the following slice, using the calculated carry-in from the previous iteration.

While the disclosed approaches, for purpose of illustration and example, are described in the context of an HMAC-SHA-2 implementations, e.g., using a SHA-256 hash function, these approaches can be applied to other members of the SHA-2 family of hash functions, or to approaches based on other hash functions. Furthermore, as described below, the disclosed template attack implementations, while generally discussed in the context of a single round per cycle implementation, can be applied in multiple rounds per cycle implementations.

To mount the disclosed template attack approaches, an underlying SHA-2 function should be directly accessible without use of the associated HMAC wrapper. That is, the SHA-2 function should be configured to be invoked independently.

While there have been attempts to implement side-channel attacks on HMAC-SHA-2 implementations using power analysis techniques to attack HMAC-SHA-2, those attacks have been unsuccessful in forging HMAC signatures. This disclosure describes approaches for mounting a successful template attack on HMAC-SHA-2 implementations, which approaches have been experimentally verified. These experiments were performed based on an open-source hardware SHA-256 implementation that was implemented in two ways, e.g., using a pre-silicon side-channel leakage simulator, and using a field-programmable-gate-array (FPGA). In both experimental implementations, the disclosed template attack approaches provided for discovery of key derivatives that allow for successfully forging HMAC signatures. On the FPGA implementation, an example attack (e.g., trace acquisition and analysis) took approximately two hours, including a profiling stage and attack stage, as described below, and about half an hour excluding the profiling stage (e.g., for only the attack stage).

Example Methods

FIG. 1 is a flowchart illustrating a method 100 for testing an HMAC implementation for vulnerability to a side-channel attack according to an aspect. That is, FIG. 1 illustrates an example method for testing susceptibility of an HMAC implementation and/or a hash function primitive (e.g., a SHA-2 hash function) of an HMAC implementation to a side-channel attack (e.g., a template attack). The method of FIG. 1 can be implemented using the approaches for mounting a template attack described herein. Further, the method 100 of FIG. 1 is provided by way of example and for purposes of illustration, and other methods for testing HMAC and/or SHA-2 implementations for such vulnerability using the disclosed approaches are possible. For purposes of brevity and clarity, some details of the disclosed template attack approaches are not described with respect to FIG. 1, but are, instead, described below.

The example method 100 of FIG. 1 includes, as noted above, mounting a template attack on a hash function used to implement an HMAC algorithm and/or on the HMAC implementation. In the method 100, the template attack includes, at block 110, generating, based on first side-channel leakage information associated with execution of the hash function (e.g., when executing a set of profiling vectors), a plurality of template tables. Each template table of the plurality of template tables can correspond, respectively, with a subset of bit positions of an internal state of the hash function. At block 120, the method 100 includes generating, based on second side-channel leakage information (e.g., when executing a set of attack vectors on the HMAC implementation), a plurality of hypotheses for an internal state of an invocation of the hash function based on a secret key. At block 130, the method 100 includes generating, using the hash function, respective hash values generated from each of the plurality of hypotheses and a message and, at block 140, comparing each of the respective hash values with a hash value generated using the secret key and the message. At block 150, the method 100 includes, based on the comparison, determining vulnerability of the HMAC algorithm based on a hash value of the respective hash values matching the hash value generated using the secret key and the message. That is, if a calculated hash value matches the generated hash value, the HMAC implementation is considered to be vulnerable to side-channel attacks.

Figure 2:
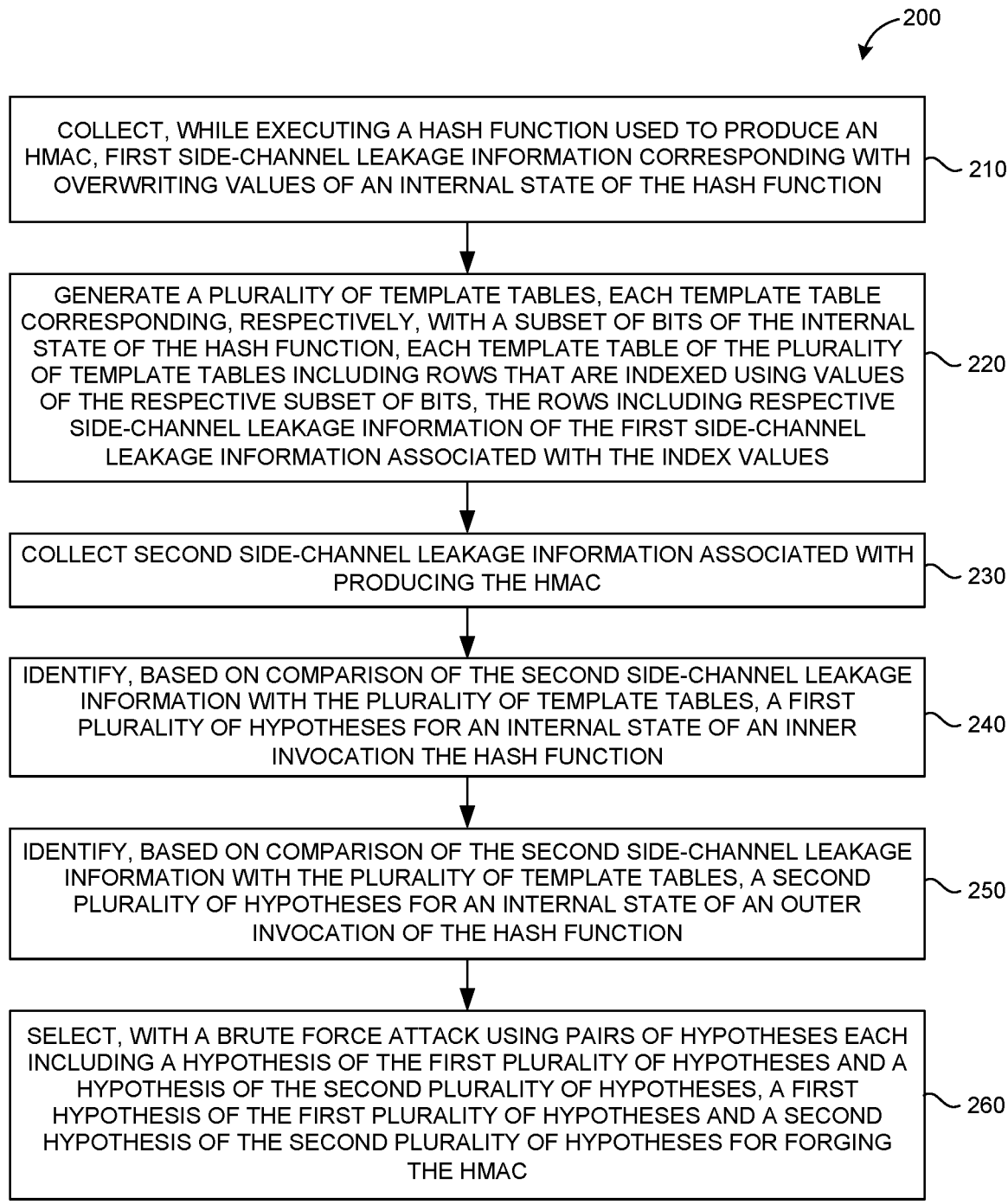
FIG. 2 is a flowchart illustrating an example method for performing a side-channel template attack on an HMAC implementation (e.g., hardware, software, simulation, etc.) according to an aspect.

FIG. 2 is a flowchart illustrating a method 200 for mounting a template attack on an HMAC implementation according to an aspect. The template attack of FIG. 2, which can be implemented using the approaches described herein, can be the basis of testing for side-channel attacked vulnerability, such as using the method 100 of FIG. 1, or can be implemented in other ways and/or in other applications. As with FIG. 1, FIG. 2 is provided by way of example and for purposes of illustration. That is, other methods for performing (mounting, executing, implementing, etc.) a template attack on a given HMAC implementation using the approaches described herein are possible. For purposes of brevity and clarity, some details of the disclosed template attack approaches are not described with respect to FIG. 2, but are, instead, described below.

The example method 200 of FIG. 2 includes, at block 210, collecting, while executing a hash function used to produce the HMAC (e.g., using profiling vectors), first side-channel leakage information corresponding with overwriting values of an internal state of the hash function. In an implementation, the first side-channel information can be as based on a Hamming distance model. At block 220, the method 200 includes generating a plurality of template tables, each template table corresponding, respectively, with a subset of bits of the internal state of the hash function. Each template table of the plurality of template tables at block 220 can include rows that are indexed using values of the respective subset of bits. The rows of the template table can include respective side-channel leakage information of the first side-channel leakage information that is associated with the index values.

At block 230, the method 200 includes collecting second side-channel leakage information associated with producing the HMAC (e.g., using a set of attack vectors). At block 240, the method 200 includes identifying (or selecting), based on comparison of the second side-channel leakage information with the plurality of template tables, a first plurality of hypotheses for an internal state of an inner invocation the hash function. In the example of FIG. 2, the method 200 further includes, at block 250, identifying, based on comparison of the second side-channel leakage information with the plurality of template tables, a second plurality of hypotheses for an internal state of an outer invocation of the hash function and, at block 260, selecting, using pairs of hypotheses each including a hypothesis of the first plurality of hypotheses and a hypothesis of the second plurality of hypotheses, a first hypothesis of the first plurality of hypotheses and a second hypothesis of the second plurality of hypotheses for forging the HMAC. The operation at block 260 can include performing a brute force attacking using the hypotheses identified at blocks 240 and 250 to identify the correct hypotheses for respective internal states (e.g., based on a respective secret key) for an inner SHA invocation and an outer SHA invocation of the HMAC implementation being attacked.

Experimental Setup

Figure 3:
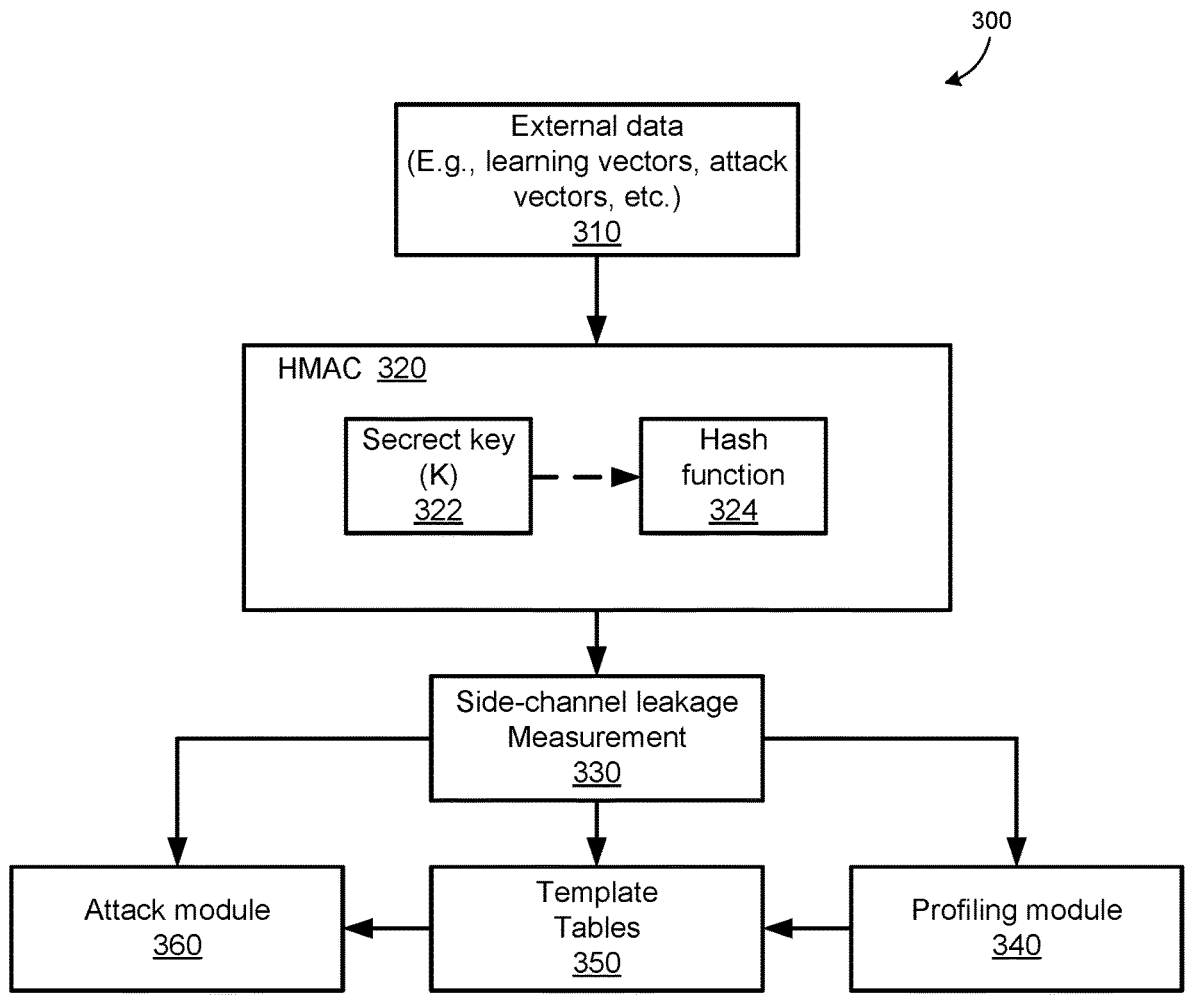
FIG. 3 is a block diagram illustrating an experimental setup for performing side-channel template attacks and associated vulnerability testing on an HMAC implementation according to an aspect.

FIG. 3 is a block diagram schematically illustrating an experimental setup 300 for performing side-channel template attacks and associated vulnerability testing on an HMAC implementation according to an aspect. As with the methods of FIGS. 1 and 2, the experimental setup (setup) 300 of FIG. 3 is given by way of example and for purposes of illustration. Additional details example of experimental setups are described below.

As shown in FIG. 3, the setup includes external data 310 that is applied to an HMAC implementation 320. The external date 310 can include, for example, learning or profiling vectors and attack vectors, as well as other data used for performing a template attack, such as the various parameters described herein. The HMAC implementation 320 of FIG. 3 includes a secret key (K) 322 and a hash function 324, which can be used in implementing an HMAC construction in accordance with Equation 1 presented above. As described herein, the hash function 324, which is described herein by of example, as a SHA-2 (e.g., SHA-256) hash function implementation should be invokable independent of the HMAC implementation 320. In mounting a template attack, as described herein, the learning vectors of the external data 310 are applied to the hash function (e.g., as known data, with a known key), while the attack vectors of the external data 310 are applied to the HMAC implementation using the secret key 322.

As shown in FIG. 3, the setup 300 also includes a side-channel leakage measurement device or block 330, which is configured to collect side-channel leakage information associated with executing the hash function 324 using the learning or profiling vectors, and to collect side-channel information associated with executing the HMAC implementation 320 using the attack vectors.

As further shown in FIG. 3, the side-channel leakage measurement 330 can be configured to provide side-channel leakage information (e.g., associated with the learning vectors) to a profiling module 340, which can be configured to generate template tables 350, such as those described herein. The side-channel leakage measurement 330 can be further configured to provide side-channel leakage information (e.g., associated with the attack vectors) to an attack module 360, where the attack module can be configured to perform a multi-step attack on the HMAC implementation 320, such as using the techniques described herein.

SHA-2 and HMAC

Figure 4:
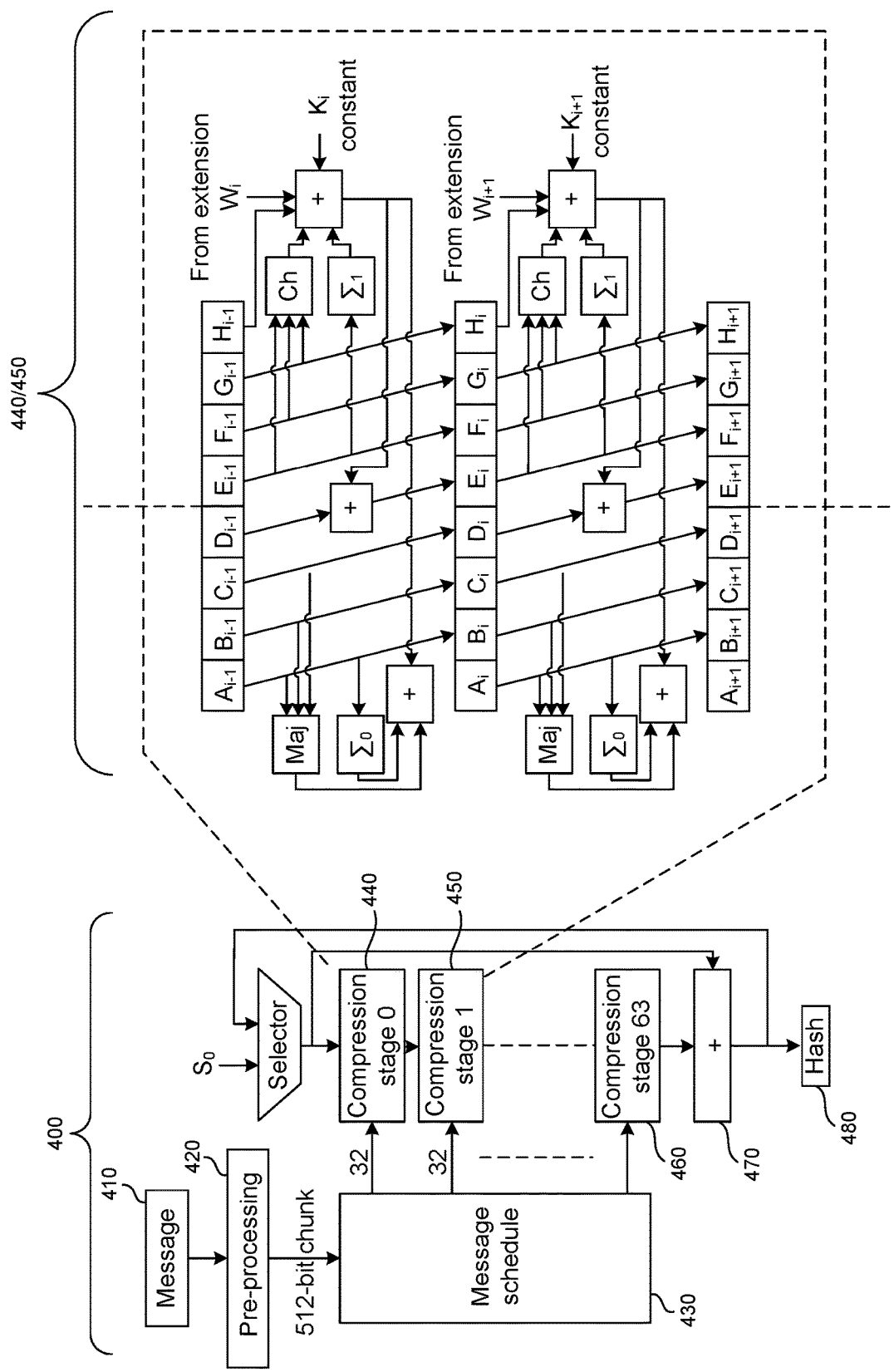
FIG. 4 is a diagram illustrating a SHA-256 algorithm block diagram according to an aspect.
Figure 5:
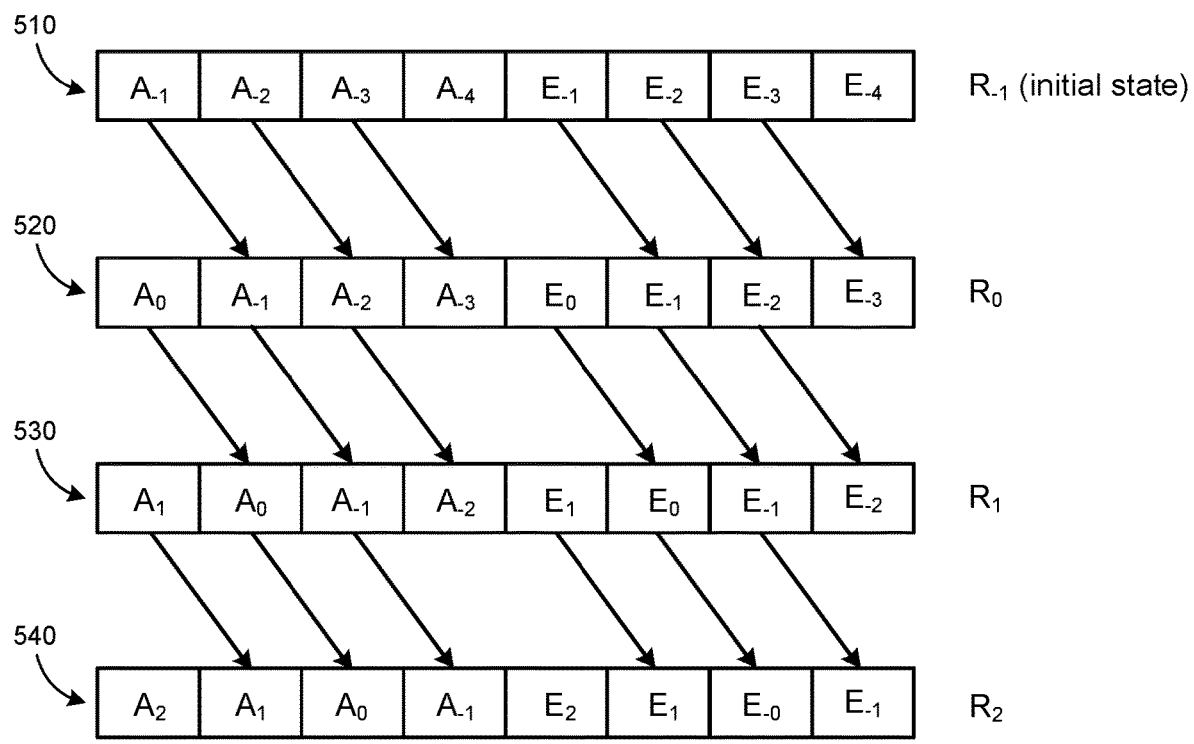
FIG. 5 is a diagram schematically illustrating three execution rounds of a compression function of a SHA-256 hash function according to an aspect.

As noted above, the template attack and associated side-channel attack vulnerability testing approaches disclosed herein are described as being mounted on, or applied to an HMAC implementation (e.g., as defined in Equation 1) that is implemented using a SHA-2 hash function, with specific reference to a SHA-256 hash. As context for discussion of these approaches, following is a discussion of SHA-2 (SHA-256), HMAC, as well as a specific (alternate) notation for SHA-256 that is used for discussion of the disclosed template attack approaches. For instance, FIG. 4 is a block diagram illustrating a SHA-256 hash function implementation according to an aspect, while FIG. 5 is a diagram illustrating the specific notation for SHA-256 used herein. It is noted that, for purposes of brevity, some details of the SHA-256 hash function implementation shown in FIG. 4 not directly relevant to the disclosed approaches may not be specifically described herein.

Referring to FIG. 4, an execution flow 400 for a SHA-256 hash function is shown. As illustrated in FIG. 4, a message 410 (e.g., of arbitrary length) is provided to a pre-processing stage 420. The pre-processing stage 420 generates a message schedule 430 based on 512 bit chunks or blocks. The message schedule 430, which is generated by the expanding a corresponding 512 bit block, can then be output, as sixty-four (64) 32-bit words to 64 respective compression function stages (stage 0 to stage 63), of which compression stage 0 440, compression stage 1 450, and compression state 63 460 are shown. The compression function stages can also be referred to as rounds (calculation rounds). FIG. 4 also illustrates a detailed diagram of two 256-bit wide compression stages of the illustrated SHA-256 hash function (e.g., compression stages 440, 450).

The SHA-2 family of hash algorithms (including the SHA-256 function of FIG. 4) utilize the Merkle-Damgard construction, in which the input message 410 (properly padded) is represented as a sequence of blocks $Bl_0$, $Bl_1, \ldots, Bl_{n-1}$, and the hash function is iteratively calculated (using the 64 compression stages and an arithmetic stage 470) as $S_{j+1}=CF(S_j, Bl_j)$ for $j\epsilon[0, 1, \ldots, n-1]$. CF is the hash algorithm's compression function, $S_0$ is a predetermined constant, and Sn is the final output (the hash value 480). The compression function $CF(S_j, Bl_j)$ for SHA-2 hash functions is calculated in the following steps (as is shown for SHA-256 in FIG. 4):

1. The message schedule 430 expands the input block Blj to a sequence of s×t-bit "words" $W_0, W_1, \ldots, W_{s-1}$, where s=64, t=32 for SHA-224 and SHA-256; and s=80, t=64 for SHA-512/224, SHA-512/256, SHA-384 and SHA-512. The particular details of how the expansion algorithm operates do not affect the approaches for executing a template attack described herein.
2. The round function RF is applied s times (e.g., by the compression stages 440, 450 . . . 460) so that $R_i$=RF $(R_{i-1}, W_i, K_i)$ for $i\epsilon[0, 1, \ldots, s-1]$ where $K_i$ are predefined "round constants", and $R_{-1}=S_j$.
3. An output of the compression function CF is then calculated as a word-wise sum modulo $2^t$ of $R_{-1}=S_j$ and $R_{s-1}$.

For the round function RF for SHA-2, the internal state (initial internal state) $R_{i-1}$ is split into eight t-bit words $A_{i-1}$, $B_{i-1}, C_{i-1}, D_{i-1}, E_{i-1}, F_{i-1}, G_{i-1}, H_{i-1}$. A next internal state $R_i$ is calculated from $R_{i-1}$ (previous internal state based on Equations 2-8 below:

$$[T_1 = H_{i-1} \boxplus \Sigma_1(E_{i-1}) \boxplus Ch(E_{i-1}, F_{i-1}, G_{i-1}) \boxplus K_i$$
$$\boxplus W_i \quad (2)$$

$$T_2 = \Sigma_0(A_{i-1}) \boxplus Maj(A_{i-1}, B_{i-1}, C_{i-1}) \quad (3)$$

$$A_i = T_1 \boxplus T_2 \quad (4)$$

$$E_i = D_{i-1} \boxplus T_1 \quad (5)$$

$$B_i = A_{i-1}, C_i = B_{i-1}, D_i = C_{i-1}, F_i = E_{i-1}, G_i = F_{i-1}, H_i = G_{i-1} \quad (6)$$

Where " $\boxplus$ " stands for addition modulo $2^t$, $\Sigma_0$ and $\Sigma_1$ are rotation functions, Ch is the bit-wise choice function $$Ch(x,y,z)=(x \wedge z) \oplus (\neg x \wedge z) \quad (7)$$

and Maj is the bit-wise majority function $$Maj(x,y,z)=(x \wedge y) \oplus (x \wedge z) \oplus (x \wedge z) \tag{8}$$

It is noted, which is relevant for the disclosed template attack approaches, that in every round (e.g., at every RF execution), only two words of the internal state are calculated, while the remaining six words of the internal state are copied from the previous internal state under a different name, such as is illustrated in FIG. 4 for compression stages (RF executions) 440, 450.

As noted above, for convenience in describing the disclosed template attack approaches, a different, or alternate notation is used for the SHA-2 internal state, in which every word of the internal state receives a unique name that does not change from round to round. This notation is illustrated in FIG. 5, which schematically illustrates, for a SHA-2 implementation using the alternate notation, an initial internal state 510 and resulting, respective internal states 520, 530, 540 for three successive rounds. In the example of FIG. 5, as in FIG. 4, arrows show copy operations, where all words of a given internal state that have incoming arrows receive an exact copy of a word from the internal state of the previous round. The remaining words of the internal states (without incoming arrows, or copied values) receive results of manipulated data from the previous round (e.g., newly calculated or generated words).

As shown in FIG. 5, using the alternate notation, the words of the initial state $R_{-1}$ 510 are designated as $A_{-1}, A_{-2}, A_{-3}, A_{-4}, E_{-1}, E_{-2}, E_{-3}, E_{-4}$. The state $R_i$ after round i (e.g., states 520, 530, 540, and so forth) can be designated as $A_i, A_{i-1}, A_{i-2}, A_{i-3}, E_i, E_{i-1}, E_{i-2}, E_{i-3}$. The purpose for use of this indexing for describing the disclosed template attack and testing approaches is to assign the index 0 to the result of the first calculation, and to assign negative indices to words of the internal state that are merely copies of the initial state 510, as is illustrated by FIG. 5. Therefore, using the alternate notation, the only two words of the internal state that are newly calculated or generated at every round are $A_i$ and $E_i$, and they are calculated using the following formulas 9-14:

$$\epsilon_i = E_{i-4} \boxplus \Sigma_1(E_{i-1}) \boxplus Ch(E_{i-1}, E_{i-2}, E_{i-3}) \boxplus K_i \tag{9}$$

$$\alpha_i = \Sigma_0(A_{i-1}) \boxplus Maj(A_{i-1}, A_{i-2}, A_{i-3}) \tag{10}$$

$$\Delta E_i = A_{i-4} \boxplus \epsilon_i \tag{11}$$

$$\Delta A_i = \epsilon_i \boxplus \alpha_i \tag{12}$$

$$E_i = \Delta E_i \boxplus W_i \tag{13}$$

$$A_i = \Delta A_i \boxplus W_i \tag{14}$$

Note that $\epsilon_i$ in Equation 9 is different from $T_1$ in Equation 2, in that the calculation of $\epsilon_i$ does not include $W_i$ (the respective portion of the message schedule for a given round) as an addend. Therefore, $\Delta A_i$ and $\Delta E_i$ depend on the previous state, but not on $W_i$. In particular, $\Delta A_0$ and $\Delta E_0$ depend only on the initial state $R_{-1}$.

As previously discussed, HMAC is a Message Authentication Code (MAC) algorithm that is based on a hash function, where an HMAC construction is defined by Equation 1 presented above. In HMAC implementations, derivation of a modified $K_0$ from a secret key K, regardless of the size of K, the size of $K_0$ is equal to a block size of the function Hash used to implement the HMAC construction. The two applications of the function Hash during the HMAC calculation can be referred to as an "inner" application or invocation and an "outer" application or invocation.

If Hash is a function from the SHA-2 family, e.g. SHA-256, then for a fixed K the first application of the SHA-256 compression function in the inner SHA-256 calculates $S^{in}=CF(S_0, K_0 \oplus ipad)$, and in the outer SHA-256 calculates $S^{out}=CF(S_0, K_0 \oplus opad)$. Note that both $S^{in}$ and $S^{out}$ depend only on K. The goal of the disclosed attack approaches is to find $S^{in}$ and $S^{out}$. Since it is difficult to invert a compression function (e.g., of a SHA-2 hash function), it follows that it is difficult to derive K or $K_0$ from $S^{in}$ and $S^{out}$. However, in order to mount a successful attack, such derivation of K or $K_0$ is not necessary, because an attacker who knows both $S^{in}$ and $S^{out}$ (for an HMAC construction based on SHA-256) can forge $HMAC_{SHA256}(K, M)$ for any message M, which is the ultimate goal of an attack on a MAC algorithm.

It follows that, in order to find $S^{in}$ and $S^{out}$ in such implementations, both the inner and outer SHA-256 must be attacked. In the disclosed approaches, there is a subtle difference (consideration) between mounting the two attacks. That is, when attacking the inner SHA-256, an attacker may choose the message M. This is not the case with the outer SHA-256, because the variable part of the input to it is the output of the inner SHA-256, $S^{in}$, which may be known to the attacker, but cannot be chosen arbitrarily. This factor makes designing an attack on the outer SHA-256 more difficult. The approaches for mounting a template attack described below work for attacking both the inner hash function invocation and the outer hash function invocation of HMAC constructions (e.g., implemented using SHA-2 hash functions).

In the discussion of the disclosed template attack approaches, the various factors and values, in particular traces and input words, are numbered starting from 0, with the exception being the initial words A and E of a SHA-256 internal state, which are numbered starting from −4, such as described above and shown in FIG. 5. The bits in each word are also numbered starting from 0, where index 0 corresponds to the least significant bits of each word.

X[i:j] stands for bits j . . . i of the word X (32>i≥j≥0).

Carry(x, y, i) stands for the carry bit into the bit position i when adding x and y.

$W_i$ stands for the $i^{th}$ input word corresponding to the trace with index t in both the profiling set and the attack set.

$A_i^t$ and $E_i^t$ stand for the words $A_i$ and $E_i$ respectively in the calculation corresponding to the trace with index t. Note that for negative lower indices i, words $A_i^t$, $E_i^t$ do not depend on t: for the first (profiling) attack stage they are the words of the standard initial state $S_0$, and for the second and third attack stages they are the secret words of $S^{in}$ or $S^{out}$ respectively. For this reason, for purposed of clarity, the upper index is omitted when the lower index is negative.

Template Attack on HMAC-SHA-2

When mounting a side-channel attack on a cryptographic algorithm, the conventional objective is to obtain, discover or derive a secret key K. However, as described above, in HMAC constructions, the secret key K does not interact directly with data that an adversary can know. Accordingly, the secret key K cannot be obtained by statistical analysis. Nevertheless, since the ultimate goal of an adversary is to be able to forge signatures, for an attack on an HMAC implementation, it is sufficient to obtain the two values $S^{in}=CF(S_0, K0$ @ipad) and $S^{out}=CF(S_0, K0 \oplus opad)$ for an HMAC implementation (or similar implementation) being attacked.

For the template attack approaches on HMAC implementations disclosed herein, it is presumed that, when conducting a profiling stage, an adversary has access to a pure hash function (e.g., SHA-256) invocation, independent of an associated HMAC construction or implementation. In the profiling stage, for the disclosed examples, CF(M) is calculated using a SHA-256 engine on a variety of one-block messages M, and an associated profiling set of power traces is acquired from side-channel leakage measurements. These traces are processed to generate the template tables described below, where the template tables are then used for matching during a multi-step attack stage, as is also described below.

In the attack stage, the secret key K is unknown, and the input message M is known, but not necessarily controlled by the adversary. The attack stage is applied (performed, mounted, executed, etc.) twice, first on an inner hash calculation and then on an outer hash calculation. In the attack stage, a set of power traces (the attack set) is acquired for the calculation of $HMAC_{SHA256}(K, M)$ for a variety of messages M (e.g., attack vectors). In an implementation, it may be sufficient to record or capture only certain parts of every trace, e.g., such as respective portions corresponding to the first two rounds of the second block calculation in both the inner SHA-256 invocation and the outer SHA-256 invocation. It is noted that, because the first blocks of both the inner SHA-256 invocation and the outer SHA-256 are constant, being dependent only on the secret key K, any side-channel data corresponding to the first block bears no useful information for forging an associated HMAC signature.

In the disclosed template attack approaches, $S^{in}$ can be determined using the template tables (generated during the profiling stage) and the portions of the traces (e.g. the attack traces) corresponding to the inner SHA-256 invocation. Knowing $S^{in}$, it is possible to calculate SHA256((K0 ⊕ ipad)||M) for every trace, thus obtaining the input message to the outer SHA-256. After determining $S^{in}$, $S^{out}$ is determine using the same template tables and the portions of the traces (e.g., the attack traces) corresponding to the outer SHA-256 invocation.

In the following discussion, example approaches for mounting an HMAC-SHA-2 template attack are first described presuming that a compression function of a corresponding SHA-256 implementation calculates one round (of the CF) in one clock cycle. Following that discussion, example approaches for applying the disclosed approaches to SHA-256 implementations that calculate two or three rounds-per-cycle are described.

As described herein, in a profiling stage of an HMAC template attack, or in testing for vulnerability to a side-channel attack, a set of traces is collected (e.g., as side-channel leakage information associated with implementation of an associated hash function) and a fixed-size set of template tables is generated from the collected traces. Different template tables of the generated template tables can correspond to different execution rounds and/or to different bit positions of words of a corresponding hash function's internal state. In each table of the template tables, a set of all the traces can be split into a set of disjoint sets, where a given line of a respective template table can correspond to one of these sets, and can contain the corresponding traces averaged over that set. These disjoint sets, in example implementations, are characterized by values of specific bits in the SHA-256 round function calculation, as described below, as illustrated by FIGS. 6A and 6B.

Figures 6A, 6B:
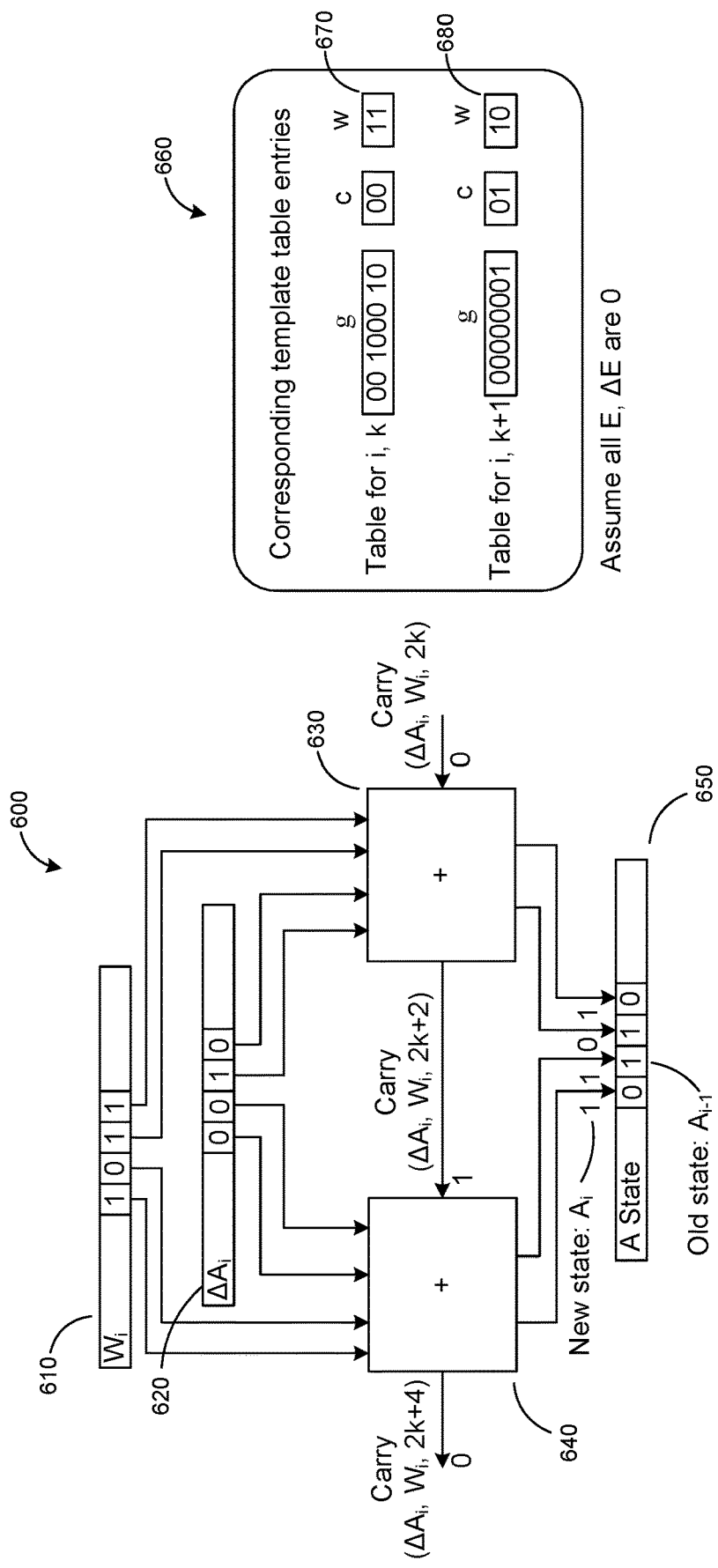
FIGS. 6A and 6B are diagrams illustrating operation of an adder used to build template tables for use in a side-channel attack according to an aspect.

FIG. 6A illustrates operation of an example 2-bit adder unit 600 that can be used to build template tables for use in the side-channel attack approaches described herein, while FIG. 6B illustrates example corresponding template table entries. In example implementations, a respective adder unit can be used to build each template table, where entries in the tables are indexed by a 12-bit vector, including the adder inputs, inclusive of carry bit(s) and a previous state of the corresponding bits of the state register. As an example, FIGS. 6A and 6B illustrate an example calculation for table entries for $A_i$.

For instance, the adder unit 600 of FIG. 6A schematically illustrates part of an addition operation of an input word $W_i$ corresponding to a trace and a word $\Delta A_i$ (such as described herein). IN FIG. 6A, an input word $W_i$ 610 contains bits 1011 at positions 2k+3 . . . 2k before round i, and a word $\Delta A_i$ 620 contains bits 0010 at the same positions before round i. In this example, a two-bit adder 630, for positions 2k+1 . . . 2k, receives inputs bits 11 from an input word $W_i$ 610, bits 10 from a word $\Delta A_i$ 620, and a carry bit 0 from addition at lower bit positions. The adder 630 then calculates 11+10+0=101 in binary, of which its two least significant bits 01 are bits of a new state at positions 2k+1 . . . 2k, and its most significant bit 1 is passed as a carry bit to another two-bit adder 640 for positions 2k+3 . . . 2k+2. Similarly, the two-bit adder 640 receives, as inputs bits, 10 from an input word $W_i$ 610, bits 00 from a word $\Delta A_i$ 620, and the carry bit 1 from the adder 630. The adder 640 then calculates 10+00+1=011 in binary, of which its two least significant bits 11 are bits of a new state at positions 2k+3 . . . 2k+2, and its most significant bit 0 is passed to a next two-bit added (not shown) as a carry bit. Calculated bits 01 from adder 630 replace previously stored bits 10 at positions 2k+1 . . . 2k in a register, and calculated bits 11 from adder 640 replace previously stored bits 01 at positions 2k+3 . . . 2k+2 in the register 650.

FIG. 6B illustrates a portion of a template table 660, showing line indices corresponding to the example trace discussed, e.g., in a table corresponding to round i and bit positions 2k+1 . . . 2k and in a table corresponding to round i and bit positions 2k+2 . . . 2k+3. For simplicity it is assumed, in this illustrative example, that all relevant bits from addition between an input word $W_i$ 610 and a word $\Delta E_i$(not shown) are zeros. Then, in this instance, index 670 of the trace in the table 660 corresponding to round i and bit positions 2k+1 . . . 2k is 00 10 00 10 00 11, where (from left to right):

1) bits 00 correspond to assumed zero bits of $\Delta E_i$,
2) bits 10 correspond to bits 10 of $\Delta A_i$,
3) bits 00 correspond to assumed zero bits of $E_{i-1}$,
4) bits 10 correspond to bits 10 of $A_{i-1}$,
5) bits 00 correspond to carry bits to bit position 2k in both additions of $W_i$ with $\Delta E_i$ and of $W_i$ with $\Delta A_i$, and
6) bits 11 correspond to bits 11 of $\Delta W_i$.

Similarly, as shown in FIG. 6B, an index 680 of the example trace in the table 660 corresponding to round i and bit positions 2k+3 . . . 2k+2 is 00 00 00 01 01 10, where (from left to right):

1) bits 00 correspond to assumed zero bits of $\Delta E_i$,
2) bits 00 correspond to bits 00 of $\Delta A_i$,
3) bits 00 correspond to assumed zero bits of $E_{i-1}$,
4) bits 01 correspond to bits 01 of $A_{i-1}$,
5) bits 01 correspond to carry bits to bit position 2k in both additions of $W_i$ with $\Delta E_i$ and of $W_i$ with $\Delta A_i$, and
6) bits 10 correspond to bits 10 of $\Delta W_i$.

Continuing from the discussion above regarding execution of a SHA-256 calculation using the described alternate notation, in round i, two new values are calculated: $A_i = \Delta A_i \boxplus W_i$ and $E_i = \Delta E_i \boxplus W_i$. If one round is calculated in one cycle, these values overwrite $A_{i-1}$ and $E_{i-1}$, respectively.

In the disclosed approaches for mounting an HMAC attack, the vectors $A_{i-1}$, $\Delta A_i$, $E_{i-1}$, $\Delta E_i$ can be found or determined by splitting those vectors into windows of size J bits for different values of i. In such an approach, a value of J determines the size of the template tables, so it should be kept reasonably small. By way of example, for J=3, the traces will be divided into $2^{5J+2} \geq 2^{17}$ groups. By way of comparison, for J=1, a one-bit addition with carry is a linear operation, and in general it is more difficult to mount side-channel attacks on linear functions. Accordingly, choosing J=2 can be a good trade-off between accuracy and complexity, and the following description presumes that J=2.

One aim of the profiling set (vector set or chosen messages) is to characterize a part of the side-channel information corresponding to the overwriting of $A_{i-1}$ and $E_{i-1}$ with the new values $A_i = \Delta A_i \boxplus W_i$ and $E_i = \Delta E_i \boxplus W_i$. To achieve that aim, in an example implementation, the calculation is split into two-bit units, indexed by k. For this purpose, for every k, where $0 \leq k < 16$, and for some value(s) of the round index I, corresponding traces can be split into $2^{12}$ groups, according to the values of the following bits:

1. $A_{i-1}[2k+1:2k]$ (2 bits)
2. $E_{i-1}[2k+1:2k]$ (2 bits)
3. $\Delta A_i[2k+1:2k]$ (2 bits)
4. $\Delta E_i[2k+1:2k]$ (2 bits)
5. Carry($\Delta A_i$, $W_i$, 2k) (1 bit)
6. Carry($\Delta E_i$, $W_i$, 2k) (1 bit)
7. $W_i[2k+1:2k]$ (2 bits)s Such 12-bit vectors, as defined above, can be split into three groups, where the 8 unknown bits of data items (items 1-4 in the list above) are designated as g, the two carry bits obtained from iteration k−1 (items 5-6 in the list above) are designated as c, and the two known message bits $W_i[2k+1:2k]$ (item 7 in the list above) are designated as w. An average value of a sample number s over all traces with specific values g, c, w at the round number i at the bit position k can be designated as $\overline{M_{g,c,w,s}}^{i,k}$.

Points of Interest (POIs) can be identified from the template tables using the following approach. It is noted, for purposed of this discussion, that both of the indices i and s, as discussed herein, correspond to a time offset in the calculation. Therefore, if the points on the time axis corresponding to these two indices are far apart, no dependency of $\overline{M_{g,c,w,s}}^{i,k}$ on w should be expected. For instance, a sample taken in round j should not depend on the bits of the input in round i, if i and j are sufficiently spread apart (e.g., spread apart in time and/or rounds). Because correspondence between the two indices may not necessarily be known, apriori, a technique to find out which pairs (i, s) bear relevant information and to drop all other pairs can be used. For example, one of the two following techniques can be used:

1. For every round i and for every trace index t, calculate, using Equation 15 below:

$$hd_i^t = HD(A_{i-1}^t, A_{i-1}^t) + HD(E_{i-1}^t, E_{i-1}^t) \quad (15)$$

where HD stands for Hamming distance.

Then for every s, a correlation coefficient between the vectors $hd_i^t$ and $T_s^t$ (the sample with index s of the trace with index t) can be calculated. Pairs (I, s) with low correlations can then be dropped or ignored.

2. For every round i and for every s, a standard deviation of $\overline{M_{g,c,w,s}}^{i,k}$ over all values of k, g, c, w can be calculated. Pairs (i, s) with low standard deviations can then be dropped or ignored.

In experiments on HMAC implementations, the above two techniques yield similar results. In the experimental results described herein, the second technique was used to determine the points of interest. As a result, for every entry (an averaged trace) in the table, only several points of interest remained. In this discussion, the number of selected or determined POIs is designated as p.

In mounting the disclosed template attack approaches, an average level of a signal (e.g., side-channel leakage) is likely to be different between respective profiling sets and attack sets. This difference can be due, in part, to the fact that the calculations in the first round of the second block of the attack set start from the same (unknown) internal state, while in the profiling set, the internal state before a round is distributed uniformly. To accommodate for this difference, $\overline{M_{g,c,w,s}}^{i,k}$ values can be normalized by subtracting an average over four values $\overline{M_{g,c,w,s}}^{i,k}$ with the same i, k, g, c, s, and all possible values of $w^t$.

When performing experimental attack, using such normalization results in successful attacks succeeds (presuming enough traces have been acquired). In experiments without normalization with similar amounts of traces on both FPGA and simulation implementations, those attacks have failed, and would require a significantly higher number of traces to be potentially successful.

In implementing template attacks using the approaches described herein, profiling traces can be reused. This is due, at least in part, to the fact that every round of the SHA-2 (or HMAC) calculation is executed on the same hardware. Therefore, it is expected that the points of interest at different rounds will have a same distribution regardless of the round index. Assuming that an initial internal state in the profiling set is chosen randomly, the only significant difference in the distribution would be that the sample indices of the points of interest are shifted according to the round index. For example, if n samples are taken at every round, then the distribution of $\overline{M_{g,c,w,s}}^{i,k}$ would not depend on the value of i. For this reason, an optimization can be used which enables more information to be extracted (determined) from a same number of traces. For instance, data corresponding to different rounds i can be merged, such that two traces, one with specific values of g, c, w at the bit position k at round $i_1$ and the other with the same values of g, c, w at the same bit position at round $i_2$ are classified to a same group, while shifting them so that the sample number $ni_1 + s$ of the first trace corresponds to the sample number $ni_2 + s$ of the second trace. The result of this approach is a set of averaged samples at POIs, every averaged sample being characterized by the values of g, c, w, the bit position k, and the POI index s. These averaged samples can be organized into 16 tables $T^k$. The table $T^k$ has $2^{10}$ rows $T_{g,c}^k$ corresponding to all possible values of g, c, and 4p columns corresponding to 4 values of w and p POIs. Every row is then represented as a 4p-dimensional vector.

In an attack stage of the disclosed template attack approaches on an HMAC-SHA-256 implementation, both the inner SHA-256 invocation and the outer SHA-256 invocation can be attacked in the same manner, where each respective attack can include the steps described below. The attack stage, as with the profiling stage, is described with reference to the alternative SHA-2 notation described above with respect to, for example, FIG. 5.

In implementations, a first step (Step 1) of an attack stag can include finding $A_{-1}$, $E_{-1}$ of an internal state of a corresponding SHA-256 invocation (e.g., inner or outer). In order to find a group of bits of $A_{-1}$, $E_{-1}$, based on the set of traces acquired during the attack stage for every k<16, vectors of dimension 4p (where p is the number of the points of interest) can be built, and the closest vectors in the table $T^k$ can be identified This process can be done iteratively from the least significant (k=0) to the most significant (k=15) bits, as described below, for instance in subsets of J bits (e.g., J=1, 2 or 3). In parallel to the discovery of bits of $A_{-1}$, $E_{-1}$, we find the corresponding bits of $\Delta A_0$ and $\Delta E_0$, as shown by the calculations of Equations 7-12 presented above. In the disclosed approaches, such bit discovery can be done in parallel for all four words of the words $A_{-1}$, $E_{-1}$, $\Delta A_0$, $\Delta E_0$, finding two bits of each word in every iteration, starting from the least significant bit(s).

For instance, in an iteration k, finding the pair of bits 2k+1:2k of these four words is attempted, assuming that the bits 2k−1:0 of all four words are already known. This allows for calculating $\text{Carry}(\Delta A_0, W_0^t, 2k)$ and $\text{Carry}(\Delta E_0, W_0^t, 2k)$ for every trace t. With these calculated carry values, all the relevant traces can be split into several subsets $U_c$ according to the two carry bits c. Although four possible values for c exist, in practice, the actual number of non-empty subsets is always strictly less than 4. For example, for k=0 there is only one possible combination (0, 0) because $\text{Carry}(x, y, 0)=0$. For k>0 and $A_0[2k-1:0]=E_0[2k-1:0]$ clearly $\text{Carry}(A_0; W_0^t, 2k)=\text{Carry}(E_0, W_0^t, 2k)$, and only two combinations (0, 0) and (1, 1) are possible. Finally, if $A_0[2k-1:0] \neq E_0[2k-1:0]$, e.g., $A_0[2k-1:0] > E_0[2k-1:0]$, then $\text{Carry}(A_0, W_0^t, 2k) \geq \text{Carry}(E_0, W_0^t, 2k)$, so one of the four combinations is excluded, and only three remain.

Every non-empty set $U_c$ can then be subdivided into four subsets $U_{c,w}$ according to $w=W_0^t[2k+1:2k]$. Finally, samples at the p points of interest can be averaged over $U_{c,w}$ for all four values of w, resulting in a vector of dimension 4p for every non-empty subset $U_c$.

The expectation is, for every c, for which $U_c$ is not empty, $V_c$ is close to the vector $T_{g,c}^k$, where g represents bits 2k+1:2k of the four words. To guess the correct g, for every g, a sum $\sigma_g = \Sigma_{c|U_c! = \emptyset}(L^2(V_c, T_{g,c}^k))$ is calculated. Here, $L^2$ stands for the Euclidean metric. The value of g, for which $\sigma_g$ has the minimal value, is taken. Then, the bit discovery can proceed to the next iteration, k+1, for k≤15.

In a second step (Step 2) of the disclosed template attack approaches, the words $A_{-2}$, $A_{-3}$, $E_{-2}$, $E_{-3}$ of a respective SHA-256 invocation can be discovered. In this stage, all possible hypotheses about the bits of $A_{-2}$, $A_{-3}$, $E_{-2}$, $E_{-3}$, can be made, where, for each hypothesis, corresponding measured vectors and corresponding vectors from the template table can be calculated and/or determine. Hypotheses with the lowest Euclidean distances can then be selected. Similar to the first step, $A_{-2}$, $A_{-3}$, $E_{-2}$, $E_{-3}$ can be found iteratively, e.g., by finding two bits of every word in every iteration.

In iteration k, finding the pair of bits 2k+1:2k of these four words is attempted, assuming that bits 2k−1:0 of all four words are already known. In addition, the words $\Delta A_0$; $\Delta E_0$; $A_{-1}$; $E_{-1}$ are known from the first step. This allows for calculating the following values for every trace t (note that functions Maj and Ch are bit-wise):

$A_0^t = \Delta A_0 \boxplus W_0^t$
$E_0^t = \Delta E_0 \boxplus W_0^t$
$\Sigma_0(A_0^t)$
$\Sigma_1(E_0^t)$
$\text{Maj}(A_0^t, A_{-1}, A_{-2})[2k-1:0] = \text{Maj}(A_0^t[2k-1:0], A_{-1}[2k-1:0], A_{-2}[2k-1:0])$
$\text{Ch}(E_0^t, E_{-1}, E_{-2})[2k-1:0] = \text{Ch}(E_0^t[2k-1:0], E_{-1}[2k-1:0], E_{-2}[2k-1:0])$
$\epsilon_1^t[2k-1:0] = E_{-3}[2k-1:0] \boxplus \Sigma_1(E_0^t)[2k-1:0] \boxplus \text{Ch}(E_0^t, E_{-1}, E_{-2})[2k-1:0] \boxplus K_1[2k-1:0]$
$\alpha_1^t[2k-1:0] = \Sigma_0(A_0^t)[2k-1:0] \boxplus \text{Maj}(A_0^t, A_{-1}, A_{-2})[2k-1:0]$
$\Delta E_1^t[2k-1:0] = A_{-3}[2k-1:0] \boxplus \epsilon_1^t[2k-1:0]$
$\Delta A_1^t[2k-1:0] = \epsilon_1^t[2k-1:0] \boxplus \alpha_1^t[2k-1:0]$
$\text{Carry}(A_1^t, W_1^t, 2k)$
$\text{Carry}(E_1^t, W_1^t, 2k)$ The traces can then be classified into $2^8$ groups $U^\sigma$, where σ represents a quadruple $A_0^t[2k+1:2k]$, $E_0^t[2k+1:2k]$, $\Sigma_0(A_0^t)[2k+1:2k]$, $\Sigma_1(E_0^t)[2k+1:2k]$). Note that for any σ all traces from $U^\sigma$ have the same (presently unknown) values of $\Delta A_1^t[2k+1:2k]$ and $\Delta E_1^t[2k+1:2k]$. Every set $U^\sigma$ can then be subdivided, similarly to what was done at the first step, into subsets $U_{c,w}^\sigma$ according to $\text{Carry}(\Delta A_1^t, W_1^t, 2k)$ and $\text{Carry}(\Delta E_1^t, W_1^t, 2k)$, and then every $U_c^\sigma$ into subsets $U_{c,w}^\sigma$ according to $W_1^t[2k+1:2k]$. However, unlike the first step, all four subsets $U_c^\sigma$ are typically non-empty, except for the case k=0 where only the combination (0, 0) of the carry bits is possible.

Similar to the first step, for every subset $U_c^\sigma$ a vector $V_c^\sigma$ can be built. Now for every one of the $2^8$ possible values of $A_{-2}[2k+1:2k]$, $A_{-3}[2k+1:2k]$, $E_{-2}[2k+1:2k]$, $E_{-3}[2k+1:2k]$ and for every $U^\sigma$, $\Delta A_1^t[2k+1:2k]$ and $\Delta E_1^t[2k+1:2k]$ are found. Along with already known $A_0^t[2k+1:2k]$ and $E_0^t[2k+1:2k]$, a value g and a vector $T_{g,c}^k$ from the template table is defined. Summing the Euclidean distances between $V_c^\sigma$ and the vector from the template table corresponding to $U_c^\sigma$ over all the pairs σ, c, a number (the sum of the distances) corresponding to the combination of $A_{-2}[2k+1:2k]$, $A_{-3}[2k+1:2k]$, $E_{-2}[2k+1:2k]$, $E_{-3}[2k+1:2k]$ can be obtained. The combination with the lowest sum of the distances is assumed to be the correct combination.

In third step (Step 3) of the attack stage, the words $A_{-4}$, $E_{-4}$ of an internal state of a respective SHA-236 invocation can be found. Where $\Delta A_0$, $A_{-1}$, $A_{-2}$, $A_{-3}$, $\Delta E_0$, $E_{-1}$, $E_{-2}$, $E_{-3}$ are already known, a simple linear calculation suffices to find $A_{-4}$, $E_{-4}$.

Rewriting equations 9-12 for i=0 we have, as Equations 16-19:

$$\epsilon_0 = E_{-4} \boxplus \Sigma_1(E_{-1}) \boxplus \text{Ch}(E_{-1}, E_{-2}, E_{-3}) \boxplus K_0 \quad (16)$$

$$\alpha_0 = \Sigma_0(A_{-1}) \boxplus \text{Maj}(A_{-1}, A_{-2}, A_{-3}) \quad (17)$$

$$\Delta E_0 = A_{-4} \boxplus \epsilon_0 \quad (18)$$

$$\Delta A_0 = \epsilon_0 \boxplus \alpha_0 \quad (19)$$

Where $A_{-4}$ and $E_{-4}$ now remain the only unknowns in these expressions, and they can be found as follows, using Equations 20-22.

$$\epsilon_0^*(E_{-1}) \boxplus \text{Ch}(E_{-1}, E_{-2}, E_{-3}) \boxplus K_0 \quad (20)$$

$$E_{-4} = \Delta A_0 \boxminus \epsilon_0^* \boxminus \alpha_0 \quad (21)$$

$$A_{-4} = \Delta E_0 \boxminus \Delta A_0 \boxminus \alpha_0 \quad (22)$$

where "$\boxminus$" stands for subtraction modulo $2^{32}$.

The disclosed template attack approaches can be extended to HMAC implementations where more than one calculation round of a corresponding hash function is performed per clock cycle. For example, such attack approaches can be applied to HMAC implementations with up to three rounds per clock cycle, with some modifications, as described below. In this discussion, the number of rounds per clock cycle (e.g., 2 or 3) is designated as d.

First, changes to template table calculations should be made. For instance, because in such multiple rounds per cycle implementations $A_i$ and $E_i$ overwrite $A_{i-d}$ and $E_{i-d}$, respectively, rather than $A_{i-1}$ and $E_{i-1}$, the classification of the traces for building the table $\overline{M}_{g,c,w,s}^{i,k}$ should be based on the following values:

1. $A_{i-d}[2k+1:2k]$ (two bits)
2. $E_{i-d}[2k+1:2k]$ (two bits)
3. $\Delta A_i[2k+1:2k]$ (two bits)
4. $\Delta E_i[2k+1:2k]$ (two bits)
5. $\text{Carry}(\Delta A_i, W_i; 2k)$ (one bit)
6. $\text{Carry}(\Delta E_i, W_i; 2k)$ (one bit)
7. $W_i[2k+1:2k]$ (two bits)

Note the change of the indices of A and E in the first two lines above, compared to the previously discussed example of one round per clock cycle.

In addition to the changes to template table calculations discussed above, for multiple rounds per cycle implementations, there should be separation of template tables based on a round index modulo d. Since in every clock cycle, d rounds are calculated, if any two round numbers are different modulo d, then they likely use different physical gates. Therefore, different template tables should be built based on the round number modulo d.

Additionally for multiple rounds per cycle implementations, changes to Step 1 and Changes to Step 2 should be made. For instance, for Step 1, in the first clock cycle, the calculated values of $A_0^t$ and $E_0^t$ overwrite $A_{-d}$ and $E_{-d}$, rather than $A_{-1}$ and $E_{-1}$. For this reason, the four words found in the first step, are $A_{-d}$, $E_{-d}$, $\Delta A_0$, $\Delta E_0$, rather than $A_{-1}$, $E_{-1}$, $\Delta A_0$, $\Delta E_0$. With this exception, the first step of an attack can be performed in exactly the same manner as in the case of one round per clock cycle, as described above. For Step 2, after the first step, $A_{-d}$ and $E_{-d}$ are already known, while $A_{-1}$, $E_{-1}$, $A_{5-d}$, $E_{5-d}$ are still unknown. Accordingly, the selected hypotheses in this case are for $A_{-1}$, $E_{-1}$, $A_{5-d}$, $E_{5-d}$.

Experimental Results

Using the approaches described herein, both a profiling stage and an attack stage of an example template attack can be performed using a single SHA-2 invocation. Accordingly, successful recovery of SHA-2 output from power traces can be sufficient for forging an HMAC SHA-2 signature.

To experimentally evaluate the disclosed template attack approaches, a low-area SHA-256 hardware implementation was used. Register-transfer level (RTL) of the SHA-256 implementation was synthesized for following two target platforms:

1. ASIC netlist using a Yosys synthesizer and a NanGate FreePDK45 Open Cell Library—The netlist was simulated using SideChannel Studio, a pre-silicon side-channel leakage simulator by FortifyIQ. The simulator includes two stages: the first (ScopeIQ) performs a power-aware functional simulation of the netlist and generates power traces and the second stage (ScoreIQ) runs the analysis.
2. Two CW305 Artix FPGA target boards by NewAE Technology with the Keysight E36100B Series DC Power Supply for power stabilization—Traces were collected using NewAE Technology ChipWhisperer-Lite kit and, after extracting points of interest, such as described herein, the traces were analyzed using ScoreIQ, in a similar fashion as the simulation-based traces. A power signal was obtained by measuring current via a shunt resistor connected serially to the FPGA supply line.

Power trace acquisition by the ScopeIQ simulator for the first platform was performed in Amazon cloud in 64 parallel threads. Trace analysis by ScoreIQ for both platforms ran on a local macOS machine.

Figure 7:
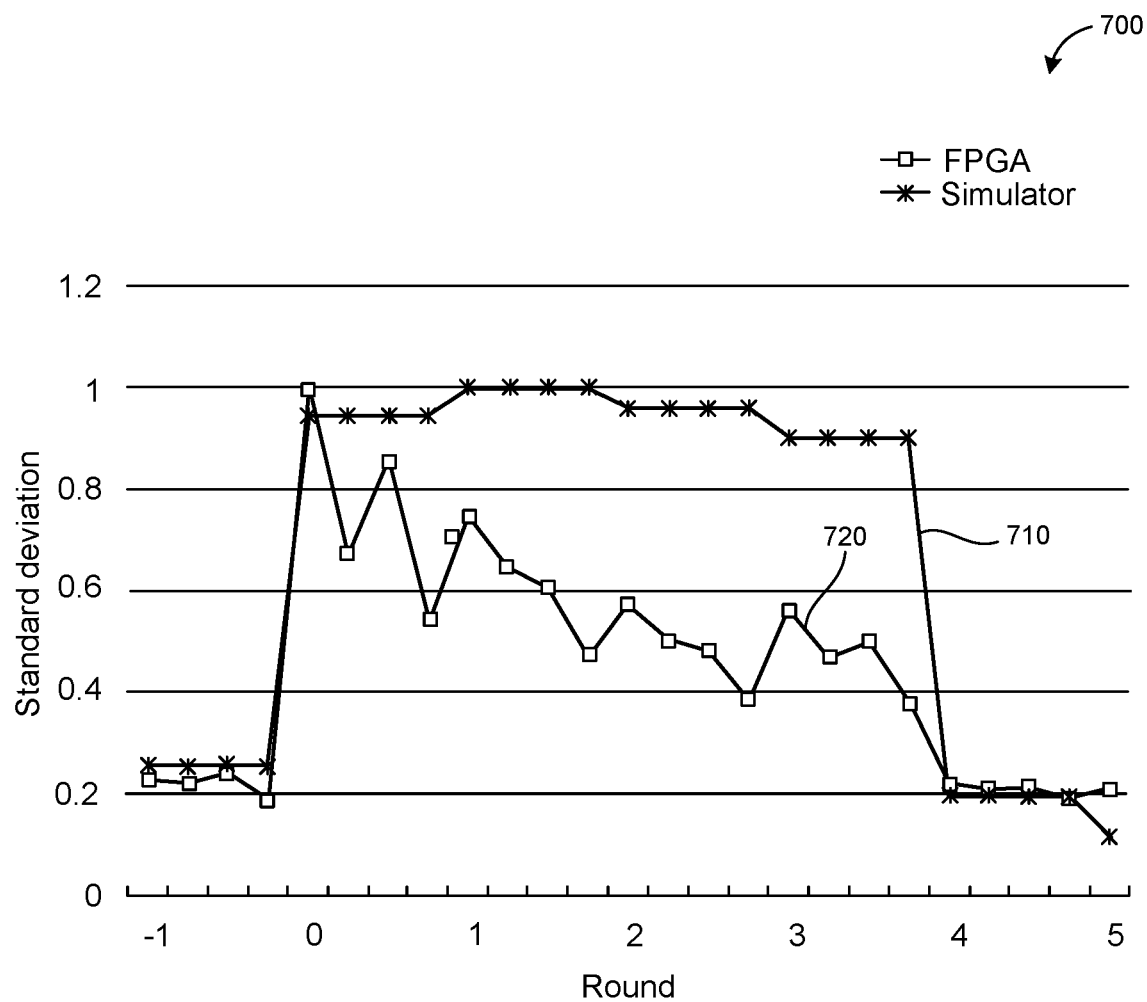
FIG. 7 is a graph illustrating standard deviations between trace samples according to an aspect.

FIG. 7 is a graph 700 illustrating standard deviation of trace samples according to an aspect. In the graph 700, standard deviation of $\overline{M_{g,c,w,s}}^{i,k}$ over time for a constant i from the simulation measurement 710 and the FPGA-based measurements 720 are shown. In the experimental data of FIG. 7, points of interest were selected in a way that increases (e.g., maximizes) the standard deviation of the trace samples for a given data set. For instance, a standard deviation for each sample in the averaged power trace $\overline{M_{g,c,w,s}}^{i,k}$ for a fixed i over all possible values of the vector (g, c, w, k) was calculated. The graph 700 of FIG. 7 illustrates normalized standard deviation of $\overline{M_{g,c,w,s}}^{i,k}$ over time in first five rounds (e.g., first five SHA-256 execution rounds) for respective traces taken from the simulation and from the FPGA. In this example, the simulator is cycle-based, and therefore it produces a single power sample per cycle. In the FPGA-based setup, four samples per cycle were taken.

As can be seen from FIG. 7, for both the FPGA and the simulator-based experiments, the standard deviation data demonstrates that the first four execution rounds (0 to 3) can provide the most information about the trace data. The slight difference between the simulator data 710 and the FPGA data 720 can be attributed to noise in the FPGA environment, in contrast to the simulator environment, where no noise was presumed.

Experiments that were performed using a known key demonstrate that a number of traces both for performing a successful, for both the attack stage and the profiling stage, can be significantly reduced by considering a few hypotheses finalists, as compared to approaches where only a best hypothesis is selected, such as in the approaches described below.

In the approaches described herein, an attack stage of a template attack includes three steps, in which steps 1 and 2 produce a prioritized list of hypotheses for an unknown hash function internal state, and step 3 includes simple calculations. Step 1 (e.g., finding $A_{-1}$, $E_{-1}$) can include choosing $q_1$ best hypotheses for bits 0, 1, where $q_1$ is a parameter expressing the number of selected hypotheses for a first stage of the disclosed template attack approaches. For subsequent bit windows, (k>0) the $q_1$ best hypotheses for bits 2k−1:0 can be selected, and then combined with 256 hypotheses for bits 2k+1:2k, which results in obtaining a total of $256q_1$ hypotheses for bits 2k+1:0. From these $256q_1$ hypotheses, the best $q_1$ hypotheses for the next step can be selected using the approaches described herein. Finally, we obtain $q_1$ hypotheses for the full values of $A_{-1}$, $\Delta A_0$, $E_{-1}$, $\Delta E_0$.

Step 2 (e.g., finding $A_{-2};A_{-3};E_{-2};E_{-3}$) can then be performed for each one of these $q_1$ hypotheses separately. Step 2 can be performed in a similar way to Step 1 by using. 2-bit windows (or using 1-bit windows, 3-bit windows, etc.), where the best $q_2$ hypotheses are selected at each iteration, $q_2$ being a parameter expressing the number of selected hypotheses for a first stage of the disclosed template attack approaches. At the end of Step 2, $q_2$ hypotheses for each of the $q_1$ hypotheses from Step 1 are obtain, which results in a total of $g_1q_2$ hypotheses for a full initial (e.g., unknown) internal state of the inner SHA-256.

After obtaining $g_1q_2$ hypotheses for the inner SHA invocation, the outer SHA invocation can be attacked in the same way, e.g., by repeating the attack for each of the hypotheses, resulting in a total of $(g_1q_2)^2$ iterations. However, the following observation helped significantly accelerate the process of attacking the outer SHA invocation. That is, using the technique for finding POIs described above, it is possible to find a correct hypothesis by correlation. Namely, for each of the $q_1q_2$ hypotheses for the inner SHA initial state, and for every trace from a subset of the attack traces the Hamming distance $hd_s^t$ can be calculated according to Equation 15, above, and its correlation with samples at the points of interest at round 6 can also be calculated. If the hypothesis is correct, the correlations are expected to be significantly above a noise level. Experimentally, it was found that in both FPGA and simulation setups, such an approaches consistently works with an arbitrary subset of 7K traces, δ=6 and a threshold value of 5% to distinguish between significant correlations and noise. In other implementations, different values for the foregoing may apply to achieve successful results.

If one of the hypotheses has passed the foregoing test, the outer SHA invocation (e.g. SHA-256) can be attacked, with the assumption that the tested hypothesis is correct. Namely, for every trace, the output from the inner SHA-256 invocation can be calculated and, in the same way, the outer SHA-256 invocation can be attacked, obtaining a total of $g_1 q_2$ hypotheses for a full initial internal state of the outer SHA-256. The correct hypothesis can then be found by a brute-force attack. In an example experimental setup, such as the setups described herein, the values $q_1=15$; $q_2=10$ were used to successfully determine initial internal states of both an inner SHA-256 invocation an outer SHA-256 invocation of the attacked HMAC implementation. In other implementations, different values of $q_1$, $q_2$ may be used to mount a successful template attack using the approaches described herein.

Suggested Approaches for Mitigation

Template attacks, including the approaches for mounting a template attack described here, include performing a profiling stage. Accordingly, if a HMAC implementation (e.g., hardware or software) is solely dedicated to calculating HMAC values using a fixed key, e.g., does not allow an arbitrary, or independent hash value (e.g., SHA-2) calculations, then a template attack using the approaches described herein cannot be mounted. However, there are some considerations when implementing such a mitigation approach. First, access to pure hash function (e.g. SHA-2) units or primitives should be blocked in all commercial implementations of a given HMAC implementation, otherwise an attacker may exploit an HMAC unit with an independently accessible hash function primitive for profiling. Second, if somewhere in a given implementation, there is a hash function unit that provides plain hash function (e.g., SHA-2) functionality, the unit should be based on a different architecture, otherwise it could be possible to use that included unit for performing a profiling stage.

A similar, but less restrictive mitigation approach is to define a execution policy that prevents large numbers of consecutive invocations of a pure hash function used to implement a given HMAC implementation. For instance, time intervals between hash function invocations could be enforced.

Alternatively, a power analysis resistant SHA-256 engine can be implemented using an adapted version of one of the methods developed for other cryptographic modules.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method for testing for vulnerability of an implementation of a hash-based message authentication code (HMAC) algorithm to a side-channel attack, the method comprising:
   mounting a template attack on a hash function used to implement the HMAC algorithm, the template attack including:
      generating, based on first side-channel leakage information associated with execution of the hash function, a plurality of template tables, each template table of the plurality of template tables corresponding, respectively, with a subset of bit positions of an internal state of the hash function; and
      generating, based on a comparison of second side-channel leakage information with the plurality of template tables, a plurality of hypotheses for an internal state of an invocation of the hash function based on a secret key;
   generating, using the hash function, respective hash values generated from each of the plurality of hypotheses and a message;
   comparing each of the respective hash values with a hash value generated using the secret key and the message; and
   based on the comparison, determining vulnerability of the HMAC algorithm based on a hash value of the respective hash values matching the hash value generated using the secret key and the message.

2. The method of claim 1, wherein the implementation of the HMAC algorithm is one of:
   a hardware implementation;
   a software implementation; or
   a simulator implementation.

3. The method of claim 1, wherein one round of a compression function of the hash function is calculated per calculation cycle of the hash function.

4. The method of claim 1, wherein a plurality of rounds of a compression function of the hash function are calculated per calculation cycle of the hash function.

5. The method of claim 1, wherein each template table of the plurality of template tables includes a plurality of rows that are indexed using values of bits of the respective subset of bit positions, the plurality of rows including respective side-channel leakage information of the first side-channel leakage information associated with the index values.

6. The method of claim 5, wherein generating the plurality of template tables includes normalizing a value of the respective side-channel information based on an average value of a plurality of values of the respective side-channel leakage information.

7. The method of claim 5, wherein the plurality of rows of the plurality of template tables are further indexed using at least one of:
   carry bit values corresponding with the subset of bits of the internal state of the hash function; or
   bit values of a portion of a message schedule used to calculate the hash function.

8. The method of claim 1, wherein collecting the first side-channel leakage information includes executing the hash function using a known message schedule as a first input block of the hash function, the first side-channel leakage information being collected based on a Hamming distance model.

9. The method of claim 1, wherein each subset of bit positions of the internal state includes a respective two-bit subset of each word of the internal state of the hash function.

10. The method of claim 1, wherein the hash function is a hash function of the Secure Hash Algorithm 2 (SHA-2) standard.

11. The method of claim 1, wherein each template table of the plurality of template tables further corresponds with a respective execution round of a compression function of the hash function.

12. The method of claim 1, wherein determining each hypothesis of the plurality of hypotheses includes determining values of respective subsets of bits of the internal state of the hash function in correspondence with the plurality of template tables.

13. The method of claim 1, wherein the hash function is implemented in hardware.

14. The method of claim 13, wherein one execution round of a compression function of the hash function is completed in one clock cycle of the hardware implementation.

15. The method of claim 13, wherein multiple rounds of an execution round of a compression function of the hash function are completed in one clock cycle of the hardware implementation.

16. The method of claim 1, wherein the first side-channel leakage information and the second side-channel leakage information include at least one of respective:
   power consumption over time;
   electromagnetic emissions over time; or
   cache miss patterns.

17. A non-transitory, computer-readable medium having instructions stored thereon, the instructions, when executed by a processor, cause the processor to test for vulnerability of an implementation of a hash-based message authentication code (HMAC) algorithm to a side-channel attack by:
   mounting a template attack on a hash function used to implement the HMAC algorithm, the template attack including:
      generating, based on first side-channel leakage information associated with execution of the hash function, a plurality of template tables, each template table of the plurality of template tables corresponding, respectively, with a subset of bit positions of an internal state of the hash function; and
      generating, based on a comparison of second side-channel leakage information with the plurality of template tables, a plurality of hypotheses for an internal state of an invocation of the hash function based on a secret key;
   generating, using the hash function, respective hash values generated from each of the plurality of hypotheses and a message;
   comparing each of the respective hash values with a hash value generated using the secret key and the message; and
   based on the comparison, determining vulnerability of the HMAC algorithm based on a hash value of the respective hash values matching the hash value generated using the secret key and the message.

18. The non-transitory, computer-readable medium of claim 17, wherein the implementation of the HMAC algorithm is one of:
   a hardware implementation;
   a software implementation; or
   a simulator implementation.

19. The non-transitory, computer-readable medium of claim 17, wherein one round of a compression function of the hash function is calculated per calculation cycle of the hash function.

20. The non-transitory, computer-readable medium of claim 17, wherein a plurality of rounds of a compression function of the hash function are calculated per calculation cycle of the hash function.

21. The non-transitory, computer-readable medium of claim 17, wherein each template table of the plurality of template tables includes a plurality of rows that are indexed using values of bits of the respective subset of bit positions, the plurality of rows including respective side-channel leakage information of the first side-channel leakage information associated with the index values.

22. The non-transitory, computer-readable medium of claim 21, wherein generating the plurality of template tables includes normalizing a value of the respective side-channel information based on an average value of a plurality of values of the respective side-channel leakage information.

23. The non-transitory, computer-readable medium of claim 21, wherein the plurality of rows of the plurality of template tables are further indexed using at least one of:
carry bit values corresponding with the subset of bits of the internal state of the hash function; or
bit values of a portion of a message schedule used to calculate the hash function.

24. The non-transitory, computer-readable medium of claim 17, wherein collecting the first side-channel leakage information includes executing the hash function using a known message schedule as a first input block of the hash function, the first side-channel leakage information being collected based on a Hamming distance model.

25. The non-transitory, computer-readable medium of claim 17, wherein each subset of bit positions of the internal state includes a respective two-bit subset of each word of the internal state of the hash function.

26. The non-transitory, computer-readable medium of claim 17, wherein the hash function is a hash function of the Secure Hash Algorithm 2 (SHA-2) standard.

27. The non-transitory, computer-readable medium of claim 17, wherein each template table of the plurality of template tables further corresponds with a respective execution round of a compression function of the hash function.

28. The non-transitory, computer-readable medium of claim 17, wherein determining each hypothesis of the plurality of hypotheses includes determining values of respective subsets of bits of the internal state of the hash function in correspondence with the plurality of template tables.

29. The non-transitory, computer-readable medium of claim 17, wherein the hash function is implemented in hardware.

30. The non-transitory, computer-readable medium of claim 29, wherein one execution round of a compression function of the hash function is completed in one clock cycle of the hardware implementation.

31. The non-transitory, computer-readable medium of claim 29, wherein multiple rounds of an execution round of a compression function of the hash function are completed in one clock cycle of the hardware implementation.

32. The non-transitory, computer-readable medium of claim 17, wherein the first side-channel leakage information and the second side-channel leakage information include at least one of respective:
power consumption over time;
electromagnetic emissions over time; or
cache miss patterns.

\* \* \* \* \*